US011366504B2

(12) United States Patent
Bikumala et al.

(10) Patent No.: US 11,366,504 B2
(45) Date of Patent: Jun. 21, 2022

(54) SAFETY FEATURE FOR A POWER SUPPLY

(71) Applicant: Dell Products L. P., Round Rock, TX (US)

(72) Inventors: Sathish Kumar Bikumala, Round Rock, TX (US); Jose Alejandro Boillat, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 671 days.

(21) Appl. No.: 16/395,404

(22) Filed: Apr. 26, 2019

(65) Prior Publication Data

US 2020/0341528 A1 Oct. 29, 2020

(51) Int. Cl.
| | |
|---|---|
| *G06F 1/28* | (2006.01) |
| *H02H 1/00* | (2006.01) |
| *H02M 1/36* | (2007.01) |
| *H02M 1/00* | (2006.01) |
| *G06F 1/26* | (2006.01) |
| *H02H 5/10* | (2006.01) |
| *H02M 1/32* | (2007.01) |
| *H02M 7/06* | (2006.01) |

(52) U.S. Cl.
CPC .................. *G06F 1/28* (2013.01); *G06F 1/26* (2013.01); *H02H 1/0007* (2013.01); *H02H 1/0092* (2013.01); *H02M 1/0006* (2021.05); *H02M 1/36* (2013.01); *H02H 5/10* (2013.01); *H02M 1/0012* (2021.05); *H02M 1/32* (2013.01); *H02M 7/06* (2013.01)

(58) Field of Classification Search
CPC ........... G06F 1/26; G06F 1/28; H02H 1/0007; H02H 1/0092; H02H 5/10; H02M 1/0006; H02M 1/0012; H02M 1/32; H02M 1/36; H02M 7/06
See application file for complete search history.

(56) References Cited

U.S. PATENT DOCUMENTS

| | | | | |
|---|---|---|---|---|
| 9,013,283 B1 * | 4/2015 | Tackaberry | ............ | G06Q 10/08 340/5.1 |
| 2016/0149717 A1 * | 5/2016 | Wada | .................. | H04L 12/2827 455/414.1 |
| 2019/0310700 A1 * | 10/2019 | Waters | .................. | G06F 1/3296 |

* cited by examiner

*Primary Examiner* — Terrell S Johnson
(74) *Attorney, Agent, or Firm* — Krishnendu Gupta; Deepika Bhayana; Derek Lam

(57) ABSTRACT

In some examples, after a jack of a power supply is connected to a port of a device, a first safety chip may provide a signal that includes an amount of power sufficient to power a second safety chip located in the power supply. After receiving a message from the second safety chip, the first safety chip may send the second chip an instruction to cause relays in the power supply to transition from open to closed, causing power to be provided by the jack to the computing device. The first safety chip may repeatedly send a continue instruction requesting the second chip to keep the relays in the closed position. If the jack is disconnected from the port, the second safety chip fails to receive the continue instruction and causes the relays to transition back to the open position, stopping power from being provided by the power jack.

20 Claims, 6 Drawing Sheets

SAFETY FEATURE FOR A POWER SUPPLY

BACKGROUND OF THE INVENTION

Field of the Invention

This invention relates generally to enabling a power supply to provide power after a power jack of the power supply has been connected to a computing device (e.g., smartwatch, smartphone, tablet, laptop, desktop, or the like) and preventing the power supply from providing power at the power jack when the power jack is disconnected from the computing device.

Description of the Related Art

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system (e.g., a computing device), such as a smartwatch, a smartphone, a tablet, a laptop, a desktop, or the like, may include a rechargeable battery and may use a power supply to recharge the rechargeable battery and to provide power when the rechargeable battery is depleted. To provide power to the device or to recharge the battery of the device, a power jack of the power supply may be connected to a power port of the device. After the power supply is plugged into an external alternating current (AC) outlet, the power supply make power available at the power jack, whether or not the power jack has been connected to the power port of the device. Thus, if the power supply is plugged into an AC outlet but not connected to the power port of the device, direct current (DC) may still be available at the unconnected power jack. The DC power available at the power jack typically ranges from a few 4 volts to 20 volts (or more) at amperages (amps) ranging from 2 to 5 amps (or more).

Providing such levels of power to a power jack when the power jack is not connected to a device can be dangerous. For example, a child placing the power jack in the child's mouth may result in injury or even death to the child. As another example, if a liquid is spilled and the power jack and a user's limb inadvertently end up in the liquid at substantially the same time, the user's limb may be injured. Thus, a power supply, when plugged into an AC outlet may make a large amount of DC power available at the power jack, even when the power jack is not connected to an IHS, making the power jack potentially hazardous to humans located nearby.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may include a first safety chip. When a power jack of a power supply is connected to a power port of the computing device, the first safety chip may provide a signal that includes an amount of power sufficient to power a second safety chip located in the power supply. After receiving a message from the second safety chip, the first safety chip may send the second chip an instruction to cause relays in the power supply to transition from open to closed, causing power to be provided by the power jack to the computing device. The first safety chip may repeatedly send a continue instruction requesting the second chip to keep the relays in the closed position. If the power jack is disconnected from the power port, the second safety chip fails to receive the continue instruction and causes the relays to transition back to the open position, stopping power from being provided by the power jack.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
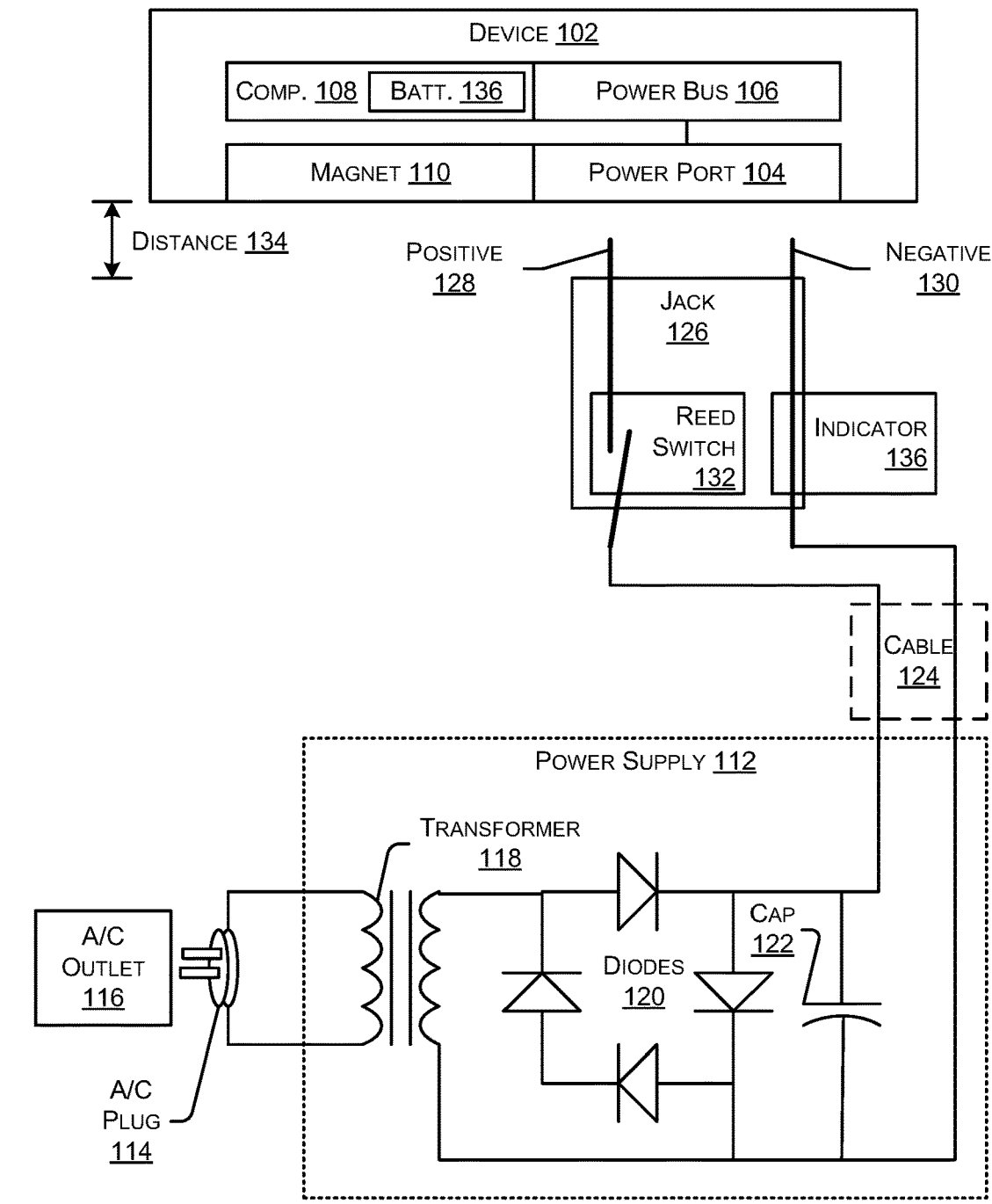
FIG. 1 is a block diagram of a system that uses a magnet to cause a power supply to provide power to a device, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein illustrate how a power supply may provide power via a power jack of the power supply when the power jack is connected to a device (e.g., a computing device, such as an IHS) and how the power is not provided when the power jack is disconnected from the device.

In a first example, a magnet may be located near a power port of a device. The power port may be associated with a proprietary power connector or a port that is compliant with a standard, such a universal serial bus (USB) Type C ("USB-C") port or the like. A magnetically-activated switch, such as, for example, a reed switch, may be located inside (or near) the power jack of the power supply. The reed switch is "normally open", e.g., when the reed switch is not located near a magnet, the reed switch is open, preventing DC voltage from being provided at the power jack of the power supply. Thus, no voltage is present at the power jack when the reed switch is not located near a magnet. When the power jack is connected to the power port of the device, the magnet near the power port causes the magnetically-activated switch to close, causing power to become available at the power jack. Thus, connecting the power jack to the power port causes the magnetically-activated switch to close, enabling DC voltage to flow from the power jack, through the power port, to the device. The device may be a smartwatch, a smartphone, a tablet, a laptop, a desktop, or another type of computing device.

In a second example, a first safety chip may be located in the device and a second safety chip may be located in the power supply. When the power jack of the power supply is connected to the power port of the device, the safety chips may communicate with each other. For example, the first safety chip in the device may provide power to the second safety chip and instruct the second safety chip in the power supply to begin providing power. In response, the second safety chip may close one (or more) switches to cause power to be provided from the power supply to the device via the power jack that is connected to the power port. The first safety chip and the second safety chip may communicate with each other using a protocol such as, for example, 1-Wire, I2C, or the like that provides low-speed (e.g., 16.3 kilobits per second (kbps)) data, signaling, and power over a single conductor. In some cases, the first safety chip and the second safety chip may use an existing third wire. For example, some computer manufacturers use a third wire between the power supply and the device to enable the device to determine whether the power supply is an authentic power supply (e.g., that satisfies the manufacturer's power supply standards). For such manufacturers, the existing third wire (in a bi-polar power supply) may be used for communication between the safety chips in addition to identifying (e.g., authenticating) the power supply. In other cases, the first safety chip and the second safety chip may use the existing negative and positive wires of the power supply to communicate with each other.

Thus, the systems and techniques enable power to be provided by a power supply when a power jack of the power supply is connected to the power port of a device. When the power jack is not connected to the power port, no power is present at the power jack, thereby preventing accidental injuries.

For example, a first safety chip of a computing device may determine that a power jack of a power supply has been connected to a power port of the computing device and sending a signal that includes power ("signaling power") to a second safety chip of the power supply. The first safety chip may receive a message from the second safety chip indicating that the second safety chip is receiving the signaling power. In response, the first safety chip may send an instruction to the second safety chip to cause the power supply to provide direct current via the power jack. The instruction to the second safety chip may specify a time at which to cause the power supply to provide direct current via the power jack. After the first safety chip determines that the power supply is providing the direct current via the power jack to the computing device, the first safety chip may stop providing the signaling power to the second safety chip. The power port may be either a proprietary port or a universal serial bus (USB) type C port. When the power port is a proprietary port, the power jack may be connected to the power supply using a cable comprising: a positive wire, a negative wire, and a communication wire. The first safety chip may send the signaling power to the second safety chip over the communication wire. When the power port is a USB type-C port implementing USB compliant power delivery, the power jack may be connected to the power supply using a USB type-C compliant cable, and the first safety chip may send the signaling power and the instruction to the second safety chip over a configuration channel (pins A5, B5) of the USB type-C port. The first safety chip and the second safety chip may communicate with each other using a 1-wire protocol, an I2C protocol, or the like. The first safety chip may determine a battery level of a battery of the computing device, determine that the battery level is greater than or equal to a predetermined battery threshold (e.g., 70%, 80%, 90%, 95%, or the like), and stopping sending the instruction to the second safety chip to cause the power supply to provide direct current via the power jack. For example, the first safety chip may stop sending the instruction to stop charging the battery further to condition and extend a life of the battery. The first safety chip may determine a second battery level of the battery of the computing device, determine that the second battery level is less than a second predetermined battery threshold (50%, 60%, 70% or the like) and resume sending the instruction to the second safety chip to cause the power supply to resume providing direct current to the computing device via the power jack.

A power supply may include a transformer, a rectifier bridge, and a capacitor to convert A/C to D/C. The power supply may include (i) a first relay located between a transformer and a first wire of a plug that is connected to a wall socket providing alternating current and (ii) a second relay located between the transformer and a second wire of the plug. The first relay and the second relay may have a normally open state. The power supply may include a second safety chip that is configured to receive signaling power from a first safety chip in a computing device after a power jack of the power supply is connected to a power port of the computing device and send, to the first safety chip, a message indicating that the second safety chip is receiving the signaling power. The second safety chip may be further configured to receive, from the first safety chip, an instruction to initiate power deliver to the computing device from the power supply and causing the first relay and the second relay to latch, e.g., transition from the normally open state to a closed state, resulting in direct current being provided by the power jack to the computing device. If the second safety chip stops receiving, from the first safety chip, the instruction, the second safety chip may be configured to cause the first relay and the second relay to transition from the closed state to the normally open state, thereby causing power to stop being provided by the power jack to the computing device.

The first safety chip and the second safety chip may communicate using a 1-wire protocol, an I2C protocol, or the like. The power supply may include a cable connecting the power jack to the power supply. The power jack may be a proprietary connector or compliant with a stand, such as USB Type-C. If the power jack is a proprietary connector, the cable may include a positive wire, a negative wire, and a communication wire. The first safety chip and the second safety chip may communicate using the communication wire. For example, the first safety chip may send the signaling power to the second safety chip over the communication wire. When the power port is a USB type-C port implementing USB compliant power delivery, the power jack may be connected to the power supply using a USB type-C compliant cable, and the first safety chip may send the signaling power and the instruction to the second safety chip over a configuration channel (pins A5, B5) of the USB type-C port. For example, the first safety chip may send the signaling power and the instruction to the second safety chip over the CC of the USB type-C port using alternate mode.

FIG. 1 is a block diagram of a system 100 that uses a magnet to cause a power supply to provide power to a device, according to some embodiments. The system 100 may include a device 102. The device 102 may include a power port 104, a power bus 106, one or more components 108, and a magnet 110. The power port 104 may be a proprietary port (e.g., ring and tip) or a port that is compliant with a standard, such as USB-C or the like. The power port 104 may distribute power to the components 108 of the device 102 via the power bus 106. The components 108 may include, for example, one or more processors, a memory storage device, a communications interface, a display device, additional ports, a battery 136, and the like. The magnet 110 may be a permanent magnet that is located close to the power port 104. For example, the magnet 110 may be adjacent to the power port 104 or may be toroidal shaped and concentrically located on an outer circumference of the power port.

The system 100 may include a power supply 112. The power supply 112 illustrated in FIG. 1 is a simplified version showing the primary components to illustrate how the power supply 112 may be modified according to the systems and techniques described herein. The power supply 112 may include an A/C plug 114 to be plugged into an A/C outlet 116 to draw A/C voltage (e.g., 110 volts or 220 volts). The power supply 112 may include a transformer 118, a set of four diodes 120 (also referred to as a diode bridge or a bridge rectifier), and a capacitor 122. The transformer 118 may step-down the A/C voltage to a lower voltage (e.g., 12 volts, 7 volts, 5 volts, or the like). The set of diodes (e.g., rectifiers) 120 may convert the A/C voltage to D/C voltage. The capacitor 122 may repeatedly store and release D/C voltage to smooth the D/C voltage after it has been converted from the A/C voltage. The power supply 112 may include a cable 124 that terminates in a jack 126. The cable 124 may include a positive 128 cable and a negative cable 130. A reed switch 132 may be connected inline with the positive 128 cable. The reed switch 132 may be normally open, such that there is no voltage across the positive 128 and the negative 120 when the jack 126 is not near the magnet 110.

After the jack 126 is brought within a predetermined distance 134 (e.g., 1 centimeter (cm) or less) of the power port 104, a strength of a magnetic field of the magnet 110 may cause the reed switch 132 to change from open to closed, causing a voltage to become available across the positive 128 and the negative 120. The power provided by the power supply 112 may be used to power the device 102 and recharge the battery 136. Thus, when the jack 126 is plugged into the power port 104, the magnet field of the magnet 110 causes the reed switch 132 to close, causing power to be provided to the device 102 via the power port 104. When power flows from the jack 126 through the power port 104 to the components 108, an indicator 136 (e.g., a light emitting diode (LED) or the like) may indicate that power is being provided at the jack 126.

After the jack 126 is removed from the power port 104, the magnetic field of the magnet 110 no longer causes the reed switch 132 to close, resulting in the reed switch changing from closed to open. After the jack 126 is removed from the power port 104, no voltage is available across the positive 128 and the negative 120. Thus, after the jack 126 is removed from the power port 104, the reed switch 132 changes from closed to open, preventing power from being available via the jack 126. In this way, power is available via the jack 126 when the jack 126 is near the power port 104 (e.g., within the predetermined distance 134 from the magnet 110). Power is not available via the jack 126 when the jack 126 is away from the power port 104 (e.g., more than the predetermined distance 134 from the magnet 110).

Thus, a child placing the jack 126 in their mouth is not harmed because no power is available via the jack 126 when the jack 126 is not near the power port 104. If a liquid spills and both the jack 126 and a user's appendage are in the liquid, injury to the user's appendage is prevented because no electricity is available via the jack 126 when the jack 126 is not near the power port 104. In this way, the power supply 112 provides power when the jack 126 is near or plugged into the power port 104 and does not provide power otherwise.

Figure 2:
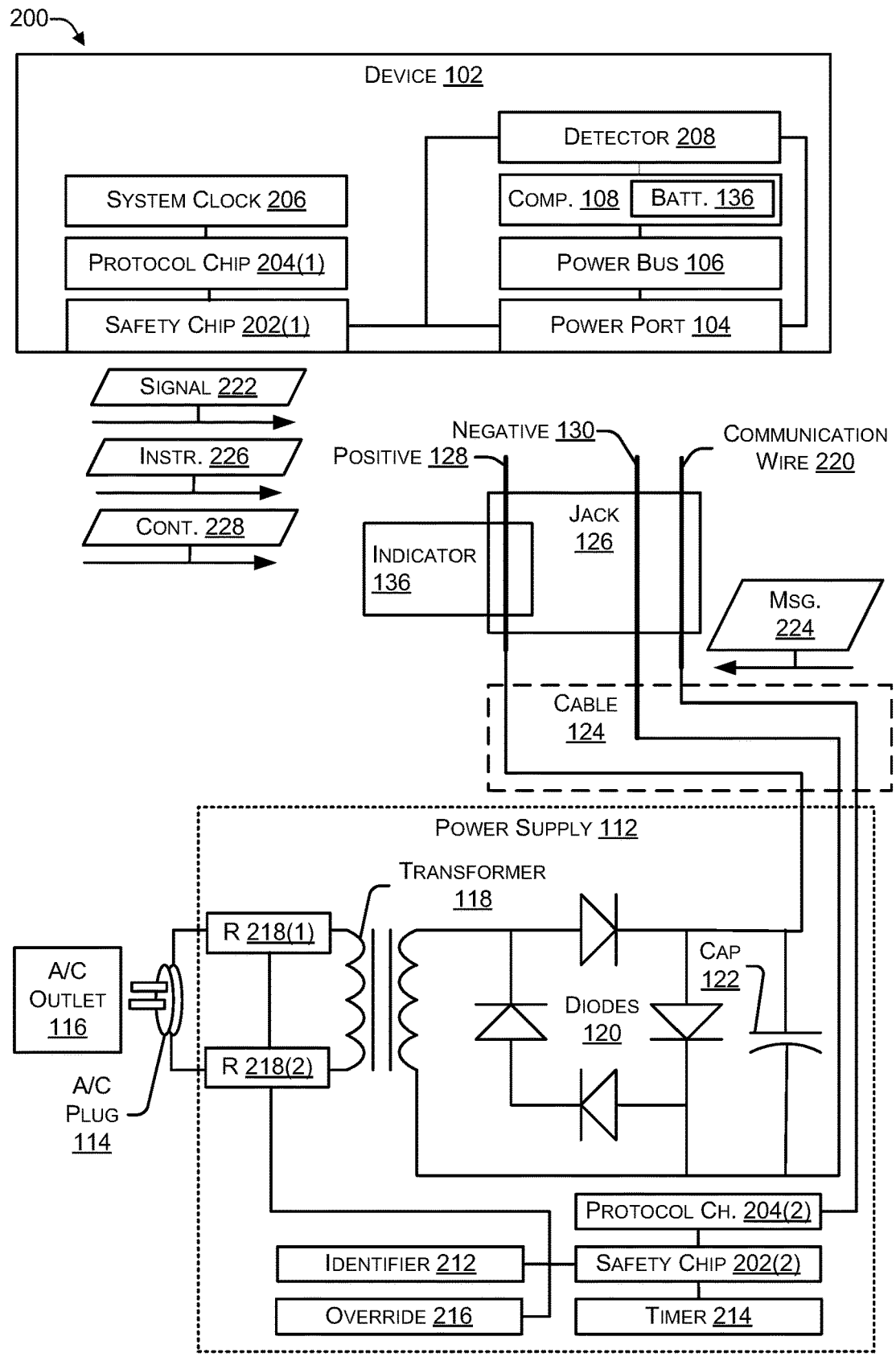
FIG. 2 is a block diagram of a system that uses a chip in a device and a chip in a power supply to negotiate when power is to be provided by the power supply to the device, according to some embodiments.

FIG. 2 is a block diagram of a system 200 that uses a first chip in a device and a second chip in a power supply to negotiate when power is to be provided by the power supply to the device, according to some embodiments. The system 200 may include the device 102 and the power supply 112.

The device 102 may include the power port 104, the power bus 106, the components 108, a safety chip 202(1) (e.g., a first safety chip), a protocol chip 204(1) (e.g., a first protocol chip), a system clock 206, and a detector 208. The power port 104 may be a proprietary port or a standardized port (e.g., USB-C) capable of mating with the power jack 126.

The power supply 112 may include a safety chip 202(2) (e.g., a second safety chip), a protocol chip 204(2) (e.g., a second protocol chip), an identifier 212, a timer 214, and an override selector 216. The power supply 112 may include two relays 218(1), 218(2), e.g., electrically controlled switches, connected between the A/C plug 114 and the transformer 118. The relays 218 may be normally open such that A/C is not normally flowing from the A/C outlet 116 to the transformer 118. The cable 124 that runs from the power supply 112 to the device 102 may include the positive (wire) 128 and the negative (wire) 130. In some cases, the cable 124 may include a communication wire 220. The communication wire 220 may be used by the device 102 to query the identifier 212 of the power supply 112 to enable the device 102 to determine whether the power supply 112 is authentic (e.g., manufactured by an authorized provider, complies with a particular set of specifications, or the like).

The protocol chips 204 may enable the safety chips 202 to communicate with each other using one or more protocols, such as, for example, 1-wire, I2C, or the like. The protocol chips 204 may communicate with each other over the communication wire 220 or, in some cases, over the positive 128 and negative 130 wires. For example, the protocol chip 204(1) may receive a command from the safety chip 202(1) and transmit the command using a particular protocol to the protocol chip 204(2). The protocol chip 204(2) may receive the command using the particular protocol, retrieve the command, and send the command to the safety chip 202(2). The protocol chip 204(2) may receive a command from the safety chip 202(2) and transmit the command using a particular protocol to the protocol chip 204(1). The protocol chip 204(1) may receive the command using the particular protocol, retrieve the command, and send the command to the safety chip 202(1). As discussed herein, the safety chip 202(1) may be the master chip while the safety chip 202(2) may be the subordinate chip. While the protocol chips 204(1), 204(2) are illustrated in FIG. 2 as being separate from the safety chips 202(1), 202(2), in some cases, the protocol chip 204(1) may be integrated into the safety chip 202(1) and the protocol chip 204(2) may be integrated into the safety chip 202(2). For ease of discussion, it should be understood herein that when the safety chips 202 are communicating with each other, the safety chips 202 may communicate using the protocol chips 204. The safety chips 202(1), 202(2) may be implemented as embedded controllers, microcontrollers, logic devices configured with logical instructions, micro-processors with firmware instructions, or the like.

When the jack 126 is not plugged into the power port 104, the relays 218 are normally open, and no voltage is present across the positive 128 and the negative 130. When the jack 126 is connected (e.g., plugged in) to the power port 104, the relays 218 are open and no voltage is present in the power supply 112. The detector 208 may determine (e.g., detect) that the jack 126 has been plugged into the power port 104. For example, the detector 208 may periodically (e.g., every N milliseconds (ms), where N>0, such as N=100, 200, 300, or the like) poll the power port 104 to determine whether the jack 126 has been plugged in. Alternately, in some cases, a nearfield communications (NFC) token may be placed in the jack 126 and the detector 208 may detect the NFC token to detect that the jack 126 has been connected to the power port 104. In other cases, an endstop switch in the power port 104 may be used. For example, inserting the jack 126 into the power port 104 causes the endstop switch to change (e.g., from open to closed or from closed to open). The detector 208 may periodically poll the endstop switch and detect when the endstop switch changes (e.g., from open to closed or from closed to open). In still other cases, a ground sensor may be used in the power port 104 to detect when the negative 130 is present to enable the detector 208 to determine when the jack 126 is inserted into the power port 104.

After the detector 208 determines (e.g., detects) that the jack 126 has been connected to the power port 104, the detector 208 may notify the safety chip 202(1) that the jack 126 has been connected to the power port 104. The safety chip 202(1) may send a signal 222, using the communication wire 220 (or using the positive 128 and negative 130 wires), to the safety chip 202(2). The signal 222 may include a small amount of power, e.g., sufficient to power the safety chip 202(2) and the protocol chip 204(2), enabling the safety chip 202(1), 202(2) to communicate with each other. The signal 222 may include power because, at this point in time, the relays 218 are open and therefore there is no power available in the power supply 112. For example, after receiving the signal 222 from the safety chip 202(1), the safety chip 202(2) may send a message 224 (e.g., an acknowledgement (ACK) signal) to the safety chip 202(1) indicating that the safety chip 202(2) is receiving the signal 222 and awaiting instructions. Typically, the safety chip 202(1) may configured to be a master chip while the safety chip 202(2) may be configured to be a subordinate chip.

Based on the system clock 206, the safety chip 202(1) may send an instruction 226 to the safety chip 202(2) to latch (e.g., change from open to closed) the relays 218 at a predetermined time, e.g., M milliseconds (where M=100, 200, 300 milliseconds (ms), or the like), after the safety chip 202(2) receives the (initial) instruction 226. In response to the instruction 226, the safety chip 202(2) may set the timer 214 to count down M ms. After the timer 214 counts down to zero, the safety chip 202(2) may cause the relays 218 to latch (e.g., change from open to closed). In this way, the safety chips 202(1), 202(2) may coordinate a particular time when the power supply 112 begins to provide power via the jack 126. The predetermined time M may be specified by a manufacturer of the power supply 112 or the safety chip 202(1) may include the predetermined time M in the instruction 226.

After the relays 218 latch, the A/C from the A/C outlet 116 may flow through the transformer 118, the diodes 120, and the capacitor 122 to provide DC power at the jack 126 (e.g., across the positive 128 and negative 130). The DC power may flow from the jack 126, through the power port 104 and the power bus 106, to the components 108. In this way, the power supply 112 provides power to the device 102 after the jack 126 has been connected to the power port 104. The safety chip 202(1) may monitor the power port 104 to determine when the jack 126 begins to provide power to the power port 104. After the safety chip 202(1) determines that the jack 126 (e.g., the power supply 112) is providing power to the power port 104, the safety chip 202(1) may stop providing the signal 222 that includes power to the safety chip 202(2). The power flowing from the jack 126 through the power port 104 to the device 102 may cause the indicator 136 to light up, indicating that power is being provided by the jack 126.

After the jack 126 has been connected to the power port 104 and power is being supplied by the power supply 112 to the device 102, the safety chips 202(1), 202(2) may continue to remain in communication. For example, the detector 208 may periodically (e.g., every N ms) poll the power port 104 to determine whether the jack 126 is still attached to the power port 104. If the detector 208 determines that the jack 126 is attached to the power port 104, the detector 208 may indicate to the safety chip 202(1) that the jack 126 is attached to the power port 104. In response, the safety chip 202(1) may (periodically) send a continue instruction 228 to the safety chip 202(2) to continue to keep the relays 218 in the closed position. After polling the power port 104, if the detector 208 determines that the jack 126 is not attached to the power port 104, the detector 208 may indicate to the safety chip 202(1) that the jack 126 is not attached to the power port 104. Because the jack 126 is no longer connected to the power port 104, the safety chip 202(2) does not receive the continue instruction 228 from the safety chip 202(1). The safety chip 202(2) therefore no longer keeps the relays 218 in the closed position, causing the relays 218 to move from the closed position to the open position (e.g., the normally open position). After the relays 218 open, no A/C flows from the A/C outlet 116 to the transformer 118, causing the power supply 112 to stop providing DC power at the jack 126. Thus, after the jack 126 is removed from the power port 104, the safety chip 202(2) may stop receiving the periodic continue instruction 228 from the safety chip 202(1), causing the safety chip 202(2) to stop keeping the relays 218 closed, causing the relays 218 to open, thereby stopping power from being available at the jack 126. In this way, when the jack 126 is removed from the power port 104, the power supply 112 stops providing power at the jack 126, preventing injury.

As previously mentioned, after the jack 126 has been connected to the power port 104 and power is being supplied by the power supply 112 (to the device 102), the safety chips 202(1), 202(2) may remain in communication with each other. For example, in some cases, the safety chip 202(1) may monitor a remaining battery level of the battery 136 (e.g., one of the components 108) of the device 102. When the battery level of the battery 136 is at least a predetermined level (e.g., 80%, 90% or 100%), the safety chip 202(1) may temporarily stop sending the continue instruction 228 to the safety chip 202(2), causing the safety chip 202(2) to stop keeping the relays 218 closed, causing the relays 218 to open, thereby stopping power from being available at the jack 126. Temporarily shutting off the power provided by the power supply 112 while the jack 126 is connected to the power port 104 may be done to avoid overcharging the battery 136, to condition the battery 136 (e.g., to increase a life span of the battery 136), or both. In this example, when the battery level of the battery 136 drops below a second predetermined level (e.g., 70%, 60% or below), the safety chip 202(1) may resume sending the continue instruction 228 to the safety chip 202(2), causing the safety chip 202(2) to close the relays 218, thereby causing power to be provided by the jack 126 to the device 102, including recharging the battery 136.

After the jack 126 is plugged into the power port 104, in some cases, the safety chip 202(1) may be unable to send the signal 222 to the safety chip 202(2). For example, if the battery 136 is completely drained and unable to provide power or the battery 136 has been removed and is unavailable, then the safety chip 202(1) may be unable to send the signal 222 to the safety chip 202(2). In such cases, a user may select the override selector 216. For example, the override selector 216 may be a pushbutton selector. Each time the override selector 216 is pressed, within a predetermined period of time (e.g., 1 second, 700 ms, 500 ms, or the like), each press may add to a length of time (e.g., 15 minutes, 30 minutes, 60 minutes, or the like) that the power supply 112 provides power to the device 102. The initial selection of the override 216 may cause the relays 218 to be manually closed, causing power to flow through the power supply 112 to the computing device 102 over the jack 126 connected to the power port 104. This power causes the safety chip 202(2) to awake. The safety chip 202(2) may determine that the override selector 216 was selected and count subsequent selections of the override selector 216 to set the timer 214. The override selector 216 may thus override the continue instructions 228 sent by the safety chip 202(1) to the safety chip 202(2). For example, (i) if a user presses the override selector 216 once within the predetermined period of time, the safety chip 202(2) may set the timer 214 to count down from 30 minutes, (ii) if a user presses the override selector 216 twice within the predetermined period of time, the safety chip 202(2) may set the time 214 to count down from 60 minutes, (iii) if a user presses the override selector 216 three times within the predetermined period of time, the safety chip 202(2) may set the time 214 to count down from 90 minutes and so on. Thus, the user can use the override selector 216 to cause the power supply 112 to temporarily provide power via the jack 126 even if the battery 136 is drained or missing. If the battery 136 was drained when the jack 126 was connected to the power port 104, the power supply 112 may provide power for 30, 60, 90 (or the like) minutes, causing the battery 136 to become partially charged, thereby enabling the safety chips 202(1), 202(2) to communicate with each other, as previously described. If the battery 136 is not present (or unable to hold a charge), then after the power supply 112 provides power via the jack 126 to the power port 104 of the device 102, the safety chip 202(1) may determine that the battery 136 is not present (or unable to hold a charge). The safety chip 202(1) may query the safety chip 202(2) to determine a value of the timer 214. The safety chip 202(1) may display on a display device connected to the device 102, a remaining time, based on the timer 214, that the power supply 112 will provide power (e.g., how long the relays 218 will remain closed). If the user desires to continue to work for a longer period of time, the user may select the override 216 accordingly, with each selection adding a preset amount of time (e.g., 30 minutes) to the timer 214.

When the power port 104 comprises a USB-C port, the safety chip 202(1) may communicate (e.g., the signal 222, the instruction 226, and the continue instruction 228) with the safety chip 202(2), and the safety chip 202(2) may communicate (e.g., the message 224) with the safety chip 202(1), using one or both of the configuration channels (e.g., using pins A5, B5) provided by USB-C. In some cases, the safety chips 202 may communicate with each other using USB-C alternate mode. In alternate mode, the safety chips 202 may use an alternate data protocol such as 1-wire, I2C, or the like to communication. Alternate mode may be configured using vendor-defined messages (VDM) over the configuration channels. The VDM may also be used by the computing device 102 to determine the identifier 212 of the power supply 112 to determine whether the power supply 112 is compatible with the computing device 102.

Thus, when a power supply is connected to an A/C outlet, the power supply may be designed to not provide DC power via a power jack. After the power jack is connected to a device, a first chip in the device may provide a signal that includes power to a second chip in the power supply. The two chips may communicate and set a time when the power supply provides DC power to the device. For example, the chips may communicate using a 1-wire, I2C, or other protocol using a third communication wire in the cable of the power supply or using the positive and negative cables of the power supply. The two chips may remain in constant communication such that when the power jack is disconnected from the device, the chip in the power supply stops receiving communications from the chip in the device, causing the power supply to stop providing DC power via the power jack. An override selector may enable a user to override the settings and enable the power supply to provide power to the device when the battery is depleted, unable to hold a charge, or not present. In this way, the power supply does not provide DC power at the power jack when the power supply is connected to an A/C outlet, thereby preventing injuries.

Figure 3:
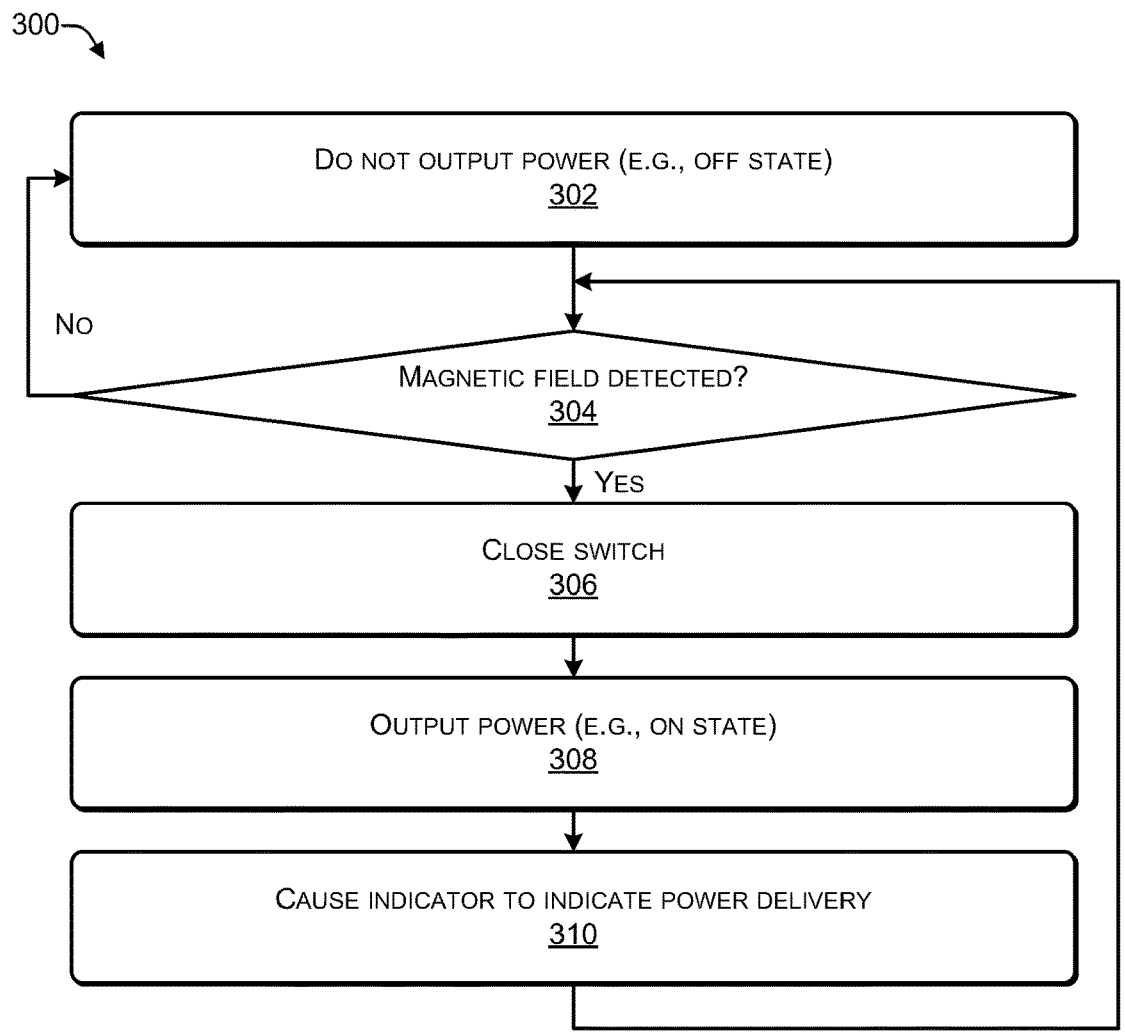
FIG. 3 is a flowchart of a process that includes closing a switch after a magnetic field is detected, according to some embodiments.
Figure 4:
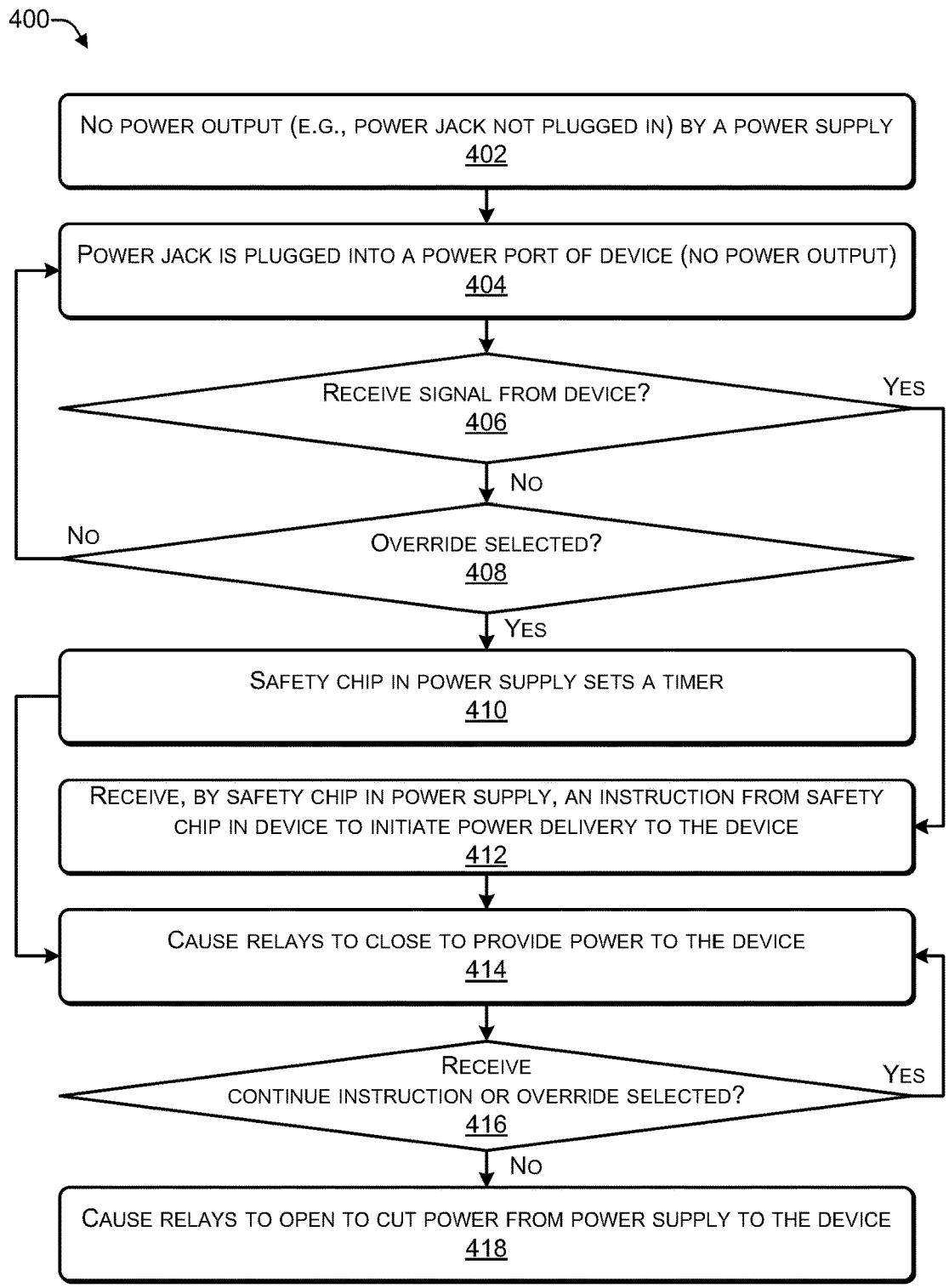
FIG. 4 is a flowchart of a process that includes providing power to a device under particular conditions, according to some embodiments.
Figure 5:
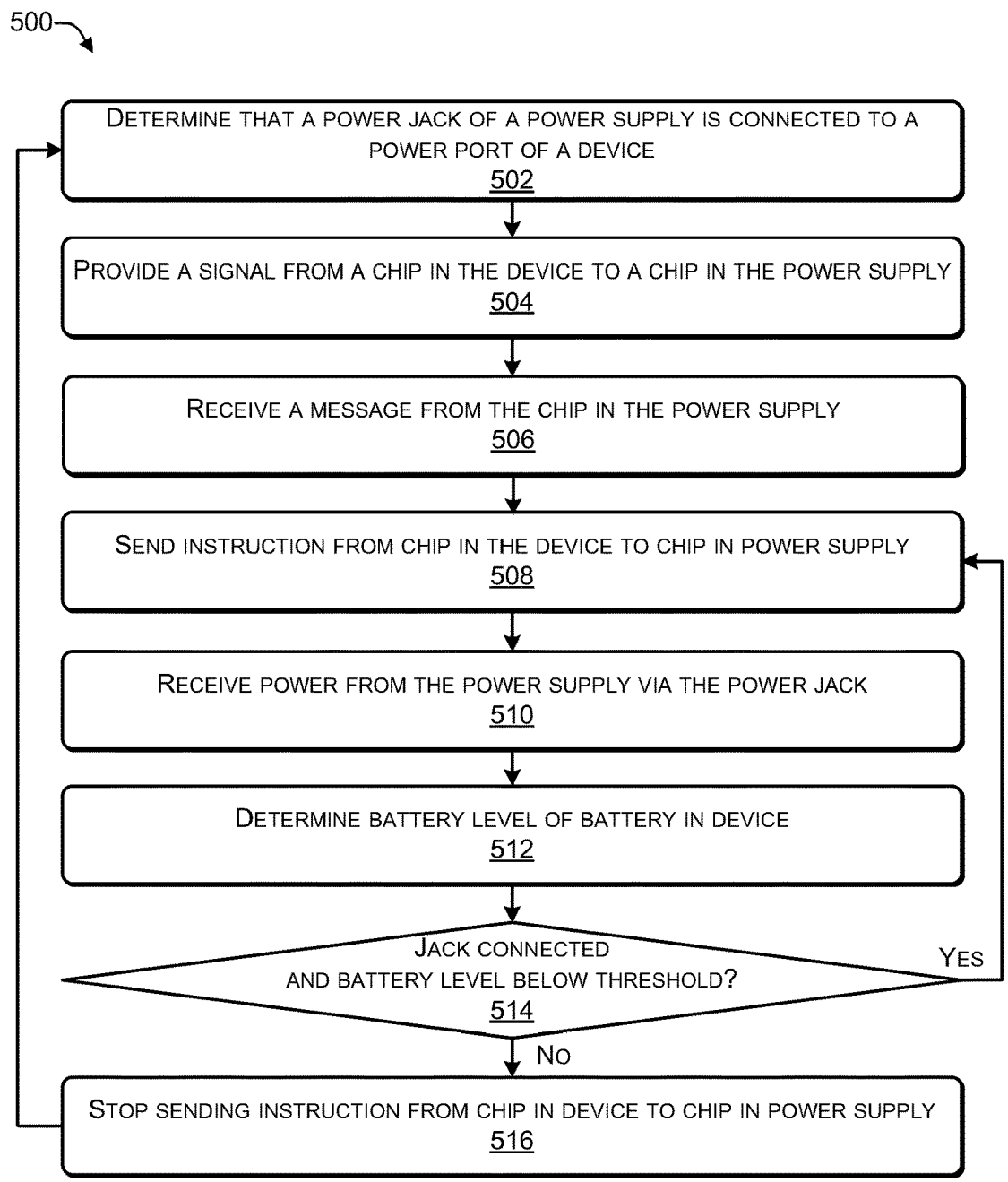
FIG. 5 is a flowchart of a process that includes providing power to a power supply by a device, according to some embodiments.

In the flow diagrams of FIGS. 3, 4, 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, and 500 are described with reference to FIGS. 1 and 2 as described above, although other models, frameworks, systems and environments may be used to implement these processes.

FIG. 3 is a flowchart of a process 300 that includes closing a switch after a magnetic field is detected, according to some embodiments. The process 300 may be performed by the power supply 112 of the system 100 of FIG. 1.

At 302, the power supply may be in an off-state in which power is not being output. At 304, the process may determine whether a magnetic field is detected. In response to determining, at 304, that "no" a magnetic field is not detected, the process may proceed to 302. In response to determining, at 304, that "yes" a magnetic field is detected, the process may proceed to 306, where a switch (e.g., reed switch) is closed. For example, in FIG. 1, before the jack 126 is connected to the power port 104, the power supply 112 may not output power via the positive 128 and negative 130 wires of the jack 126. If the jack 126 does not detect a magnetic field, then no action is taken. If the jack 126 detects the magnetic field of the magnet 110, then the magnetic field may cause the reed switch 132 to close.

At 308, the power supply may output power (e.g., via a power jack). At 310, the process may cause an indicator light (e.g., a light emitting diode (LED)) to indicate that power is being delivered, and the process may proceed to 304. For example, in FIG. 1, after the reed switch 132 closes due to the proximity of the reed switch 132 to the magnet 110, power may be output by the jack 126 (e.g., via the positive 128 and negative 130 wires) to the device 102. The power output by the jack 126 may cause the indicator 136 to indicate that power is being provided at the jack 126.

Thus, a child placing a power jack of a power supply in their mouth may not be harmed because no power is available via the power jack when the power jack is not near a magnet that is located near a power port of a device. If a liquid is spilt and both the power jack and a user's appendage come into contact with the liquid at substantially the same time, injury to the user's appendage may be prevented because power is not present at the power when the power jack is not near the magnet. In this way, the power supply provides power when the power jack is near or plugged into the power port and does not provide power otherwise.

FIG. 4 is a flowchart of a process 400 that includes providing power to a device under particular conditions, according to some embodiments. The process 400 may be performed by the power supply 112 of the system 200 of FIG. 2.

At 402, no power is output by a power supply (e.g., when the power jack is not plugged into a port of a device). At 404, the power jack of the power supply is plugged into a power port of a device (however, no power is output by the power supply). For example, in FIG. 2, when the jack 126 is not plugged into the power port 104, the relays 218 are normally open, and no voltage is present across the positive 128 and the negative 130. After the jack 126 is connected (e.g., plugged in) to the power port 104, the relays 218 remain open and no voltage is present in the power supply 112.

At 406, the process may determine whether a signal (including power) has been received from a device. If the process determines, at 406, that "no" a signal has not been received from the device, then the process may proceed to 408. If the process determines, at 406, that "yes" a signal has been received from the device, then the process may proceed to 412, where a safety chip in the power supply may receive an instruction, from a safety chip in the device, to initiate power delivery (e.g., via the power jack) to the device. For example, in FIG. 2, after the detector 206 determines (e.g., detects) that the jack 126 has been connected to the power port 104, the detector 208 may notify the safety chip 202(1) that the jack 126 has been connected to the power port 104. The safety chip 202(1) may send the signal 222, using the communication wire 220 (or using the positive 128 and negative 130 wires), to the safety chip 202(2). The signal 222 may include a small amount of power, e.g., sufficient to power the safety chip 202(2) and the protocol chip 204(2), enabling the safety chip 202(1), 202(2) to communicate with each other. The safety chip 202(1) may send the instruction 226 to the safety chip 202(2) to latch (e.g., change from open to closed) the relays 218 M after the safety chip 202(2) receives the instruction. In response to receiving the instruction 226, the safety chip 202(2) may set the timer 214 to count down M milliseconds. After the timer 214 has counted down to zero, the safety chip 202(2) may cause the relays 218 to latch (e.g., change from open to closed). In this way, the safety chips 202(1), 202(2) may coordinate a particular time when the power supply 112 begins to deliver power to the device 102 via the jack 126.

At 408, the process may determine whether an override has been selected. If the process determines, at 408, that "yes" the override has been selected, then a safety chip in the power supply may set a timer, at 410, and the process may proceed to 414. If the process determines, at 408, that "no" the override has not been selected, then the process may proceed back to 404. For example, in FIG. 2, if the battery 136 is drained, unable to hold a charge, or is otherwise unable to provide power or if the battery 136 has been removed, then the safety chip 202(1) may be unable to send the signal 222 to the safety chip 202(2). In such cases, a user may select the override selector 216. Each time the override selector 216 is selected, within a predetermined period of time (e.g., 1 second, 700 ms, 500 ms, or the like), each selection may add a length of time L (e.g., where L is 15 minutes, 30 minutes, 60 minutes, or the like). The override selector 216 may override the continue instructions 228 sent by the safety chip 202(1) to the safety chip 202(2). If a user presses the override selector 216 X times within the predetermined period of time, then the safety chip 202(2) may set the timer 214 to count down from X times L. While the timer 214 is counting down, the safety chip 202(2) may cause the relays 218 to remain closed, causing the power supply 112 to deliver power to the device 102. After the timer 214 has counted down to zero, if the safety chip 202(2) receives the continue instruction 228 from the safety chip 202(1), then the safety chip 202(2) may cause the relays 218 to remain closed. After the timer 214 has counted down to zero, if the safety chip 202(2) does not receive the continue instruction 228 from the safety chip 202(1), then the safety chip 202(2)

may cause the relays 218 to change from closed to open, stopping power delivery to the device 102. Thus, the user may use the override selector 216 to cause the power supply 112 to temporarily provide power via the jack 126 when the battery 136 is drained, unable to hold a charge, or missing.

At 414, the safety chip in the power supply may cause one or more relays in the power supply to change from a normally open state to a closed state, causing power to be delivered (e.g., via the power jack) to the device. For example, in FIG. 2, the safety chip 202(1) may send the instruction 226 to the safety chip 202(2) to latch (e.g., change from open to closed) the relays 218 at a particular time from when the safety chip 202(2) receives the instruction 226. In response to receiving the instruction 226, the safety chip 202(2) may set the timer 214 to count down to the particular time. After the timer 214 has counted down to zero, the safety chip 202(2) may cause the relays 218 to latch (e.g., change from open to closed). In this way, the safety chips 202(1), 202(2) may coordinate a particular time when the power supply 112 begins to provide power via the jack 126. Alternately, after the relays 218 latch, the A/C from the A/C outlet 116 may flow through the transformer 118, the diodes 120, and the capacitor 122 to provide DC power at the jack 126 (e.g., across the positive 128 and negative 130). The DC power may flow from the jack 126, through the power port 104 and the power bus 106, to the components 108. In this way, the power supply 112 provides power to the device 102 after the jack 126 has been connected to the power port 104.

At 416, the process may determine (i) whether the safety chip in the power supply receives a continue instruction from a safety chip in the device, (ii) whether the override has been selected. If the process determines, at 416, that "yes" the continue instruction has been received from the safety chip in the device or a selection has been received from the override, then the process may proceed back to 414, where the safety chip in the power supply continues to keep the relays closed, thereby continuing the delivery of power to the device. If the process determines, at 416, that "no" the continue instruction has not been received from the safety chip in the device or the override has not been selected, then the process may proceed to 418, where the safety chip in the power supply causes the relays to open, thereby stopping the delivery of power to the device. For example, in FIG. 2, after the jack 126 has been connected to the power port 104 and power is being supplied by the power supply 112 to the device 102, the safety chips 202(1), 202(2) may continue to communicate with each other. To illustrate, the detector 208 may periodically (e.g., every N ms) poll the power port 104 to check if the jack 126 is still attached to the power port 104. If the detector 208 determines that the jack 126 is attached to the power port 104, the detector 208 may indicate to the safety chip 202(1) that the jack 126 is attached to the power port 104. In response, the safety chip 202(1) may periodically (e.g., N ms) send the continue instruction 228 to the safety chip 202(2) to continue to keep the relays 218 in the closed position, thereby delivering power to the device 102. After polling the power port 104, if the detector 208 determines that the jack 126 is not attached to the power port 104, the detector 208 may indicate to the safety chip 202(1) that the jack 126 is not attached to the power port 104. Because the jack 126 is no longer connected to the power port 104, the safety chip 202(2) may not receive, over the communication wire 220 (or the positive 128 and negative 130 wires) the continue instruction 228 from the safety chip 202(1). The safety chip 202(2) may no longer keep the relays 218 in the closed position, causing the relays 218 to move from the closed position to the open position (e.g., the normally open position). After the relays 218 open, no A/C flows from the A/C outlet 116 to the transformer 118, causing the power supply 112 to stop providing DC power at the jack 126. Thus, after the jack 126 is removed from the power port 104, the safety chip 202(2) stops receiving the periodically sent (e.g., at a predetermined time interval) continue instructions 228 from the safety chip 202(1), causing the safety chip 202(2) to stop keeping the relays 218 closed, causing the relays 218 to open, thereby stopping power from being available at the jack 126. In this way, when the jack 126 is removed from the power port 104, the power supply 112 stops providing power at the jack 126, preventing injury.

In addition, in some cases, the safety chip 202(1) may monitor a remaining battery level of the battery 136 (e.g., one of the components 108) of the device 102. When the battery level of the battery 136 is at least a predetermined level (e.g., 80%, 90% or 100%), the safety chip 202(1) may temporarily stop sending the continue instruction 228 to the safety chip 202(2), causing the safety chip 202(2) to stop keeping the relays 218 closed, causing the relays 218 to open, thereby stopping power from being available at the jack 126. Temporarily shutting off the power provided by the power supply 112 while the jack 126 is connected to the power port 104 may be done to avoid overcharging the battery 136, to condition the battery 136 (e.g., to increase a life span of the battery 136), to increase a life of the battery 136, or the like. In this example, when the battery level of the battery 136 drops below a second predetermined level (e.g., 70%, 60% or below), the safety chip 202(1) may resume sending the continue instruction 228 to the safety chip 202(2), causing the safety chip 202(2) to close the relays 218, thereby causing power to be provided by the jack 126 to the device 102, including recharging the battery 136.

Thus, when a power supply is connected to an A/C outlet, the power supply may be designed to not provide DC power via a power jack. After the power jack is connected to a device, a first chip in the device may provide a signal that includes power to a second chip in the power supply. The two chips may communicate and set a time when the power supply provides DC power to the device. For example, the chips may communicate using a 1-wire, I2C, or other protocol using a third communication wire in the cable of the power supply or using the positive and negative cables of the power supply. The two chips may remain in constant communication such that when the power jack is disconnected from the device, the chip in the power supply stops receiving communications from the chip in the device, causing the power supply to stop providing DC power via the power jack. An override selector may enable a user to override the settings and enable the power supply to provide power to the device when the battery is depleted, unable to hold a charge, or not present. In this way, the power supply does not provide DC power at the power jack when the power supply is connected to an A/C outlet, unless the power jack is connected to the power port of the device, thereby preventing injuries.

FIG. 5 is a flowchart of a process 500 that includes providing power to a power supply by a device, according to some embodiments. The process 500 may be performed by the device 102 of the system 200 of FIG. 2.

At 502, the process may determine that a power jack of a power supply is connected to a power port of a device. At 504, a chip in the device may provide a signal (including power) to a chip in the power supply. At 506, the chip in the device may receive a message (e.g., an acknowledgement (ACK) message) from the chip in the power supply. At 508, the chip in the device may send an instruction (e.g., to initiate power delivery) to the chip in the power supply. At 510, the device may receive power (e.g., at the power port) from the power supply over the power jack. For example, in FIG. 2, after the detector 206 determines that the jack 126 has been connected to the power port 104, the detector 208 may notify the safety chip 202(1) that the jack 126 has been connected to the power port 104. The safety chip 202(1) may send a signal 222, using the communication wire 220 (or using the positive 128 and negative 130 wires), to the safety chip 202(2). The signal 222 may include a small amount of power, e.g., sufficient to power the safety chip 202(2) and the protocol chip 204(2), enabling the safety chip 202(2) to communicate with the safety chip 202(1). After receiving the signal 222 from the safety chip 202(1), the safety chip 202(2) may send the message 224 (e.g., an ACK signal) to the safety chip 202(1) indicating that the safety chip 202(2) is awake and ready to receive instructions. The safety chip 202(1) may send the instruction 226 to the safety chip 202(2) to latch (e.g., change from open to closed) the relays 218. In response to receiving the instruction 226, the safety chip 202(2) may cause the relays 218 to latch, causing the power supply 112 to provide DC power at the jack 126 (e.g., across the positive 128 and negative 130).

At 512, the process may determine a battery level of a battery located in the device. At 514, the process may determine whether (i) the power jack is connected to the power port and (ii) the battery level is below a predetermined threshold. If the process determines, at 514, that "yes" (i) the power jack is connected to the power port and (ii) the battery level is below the predetermined threshold, then the process may proceed to 508, where the chip in the device may send an instruction (e.g., a continue instruction 228) to the chip in the power supply. If the process determines, at 514, that "no", either (i) the power jack is disconnected from the power port or (ii) the battery level is greater than or equal to the predetermined threshold, then the process may proceed to 516, where the chip in the device may stop sending the instruction (e.g., a continue instruction 228) to the chip in the power supply (e.g., thereby stopping the DC voltage from being provided by the power supply to the device), and the process may proceed to 502. For example, in FIG. 2, after the jack 126 has been connected to the power port 104 and power is being supplied by the power supply 112 to the device 102, the safety chips 202(1), 202(2) may continue to remain in communication. To illustrate, the detector 208 may periodically (e.g., every N ms) poll the power port 104 to check if the jack 126 is still attached to the power port 104. If the detector 208 determines that the jack 126 is attached to the power port 104, the detector 208 may indicate to the safety chip 202(1) that the jack 126 is attached to the power port 104. In response, the safety chip 202(1) may send the continue instruction 228 to the safety chip 202(2) to continue to keep the relays 218 in the closed position. After polling the power port 104, if the detector 208 determines that the jack 126 is not attached to the power port 104, the detector 208 may indicate to the safety chip 202(1) that the jack 126 is not attached to the power port 104. Because the safety chip 202(2) does not receive the continue instruction 228 from the safety chip 202(1), the safety chip 202(2) does not keep the relays 218 in the closed position, causing the relays 218 to move from the closed position to the open position (e.g., the normally open position). After the relays 218 open, no A/C flows from the A/C outlet 116 to the transformer 118, causing the power supply 112 to stop providing DC power at the jack 126. Thus, after the jack 126 is removed from the power port 104, the power supply 112 stops providing power at the jack 126, preventing injury. The safety chip 202(1) may monitor a remaining battery level of the battery 136 of the device 102. When the battery level of the battery 136 reaches at least a predetermined level (e.g., 80%, 90% or 100%), the safety chip 202(1) may temporarily stop sending the continue instruction 228 to the safety chip 202(2), causing the safety chip 202(2) to stop keeping the relays 218 closed, causing the relays 218 to open, thereby stopping power from being available at the jack 126. Temporarily shutting off the power provided by the power supply 112 while the jack 126 is connected to the power port 104 may be done to avoid overcharging the battery 136, to condition the battery 136 (e.g., to increase a life span of the battery 136), or both. In this example, when the battery level of the battery 136 drops below a second predetermined level (e.g., 70%, 60% or below), the safety chip 202(1) may resume sending the continue instruction 228 to the safety chip 202(2), causing the safety chip 202(2) to close the relays 218, thereby causing power to be provided by the jack 126 to the device 102, including recharging the battery 136.

Thus, when a power supply is connected to an A/C outlet, the power supply may be designed to not provide DC power via a power jack. After the power jack is connected to a device, a first chip in the device may provide a signal that includes power to a second chip in the power supply. The two chips may communicate and set a time when the power supply provides DC power to the device. The two chips may remain in constant communication such that when the power jack is disconnected from the device, the chip in the power supply stops receiving communications from the chip in the device, causing the power supply to stop providing DC power via the power jack. In this way, the power supply does not provide DC power at the power jack when the power supply is connected to an A/C outlet but the power jack is not connected to the power port, thereby preventing injuries.

Figure 6:
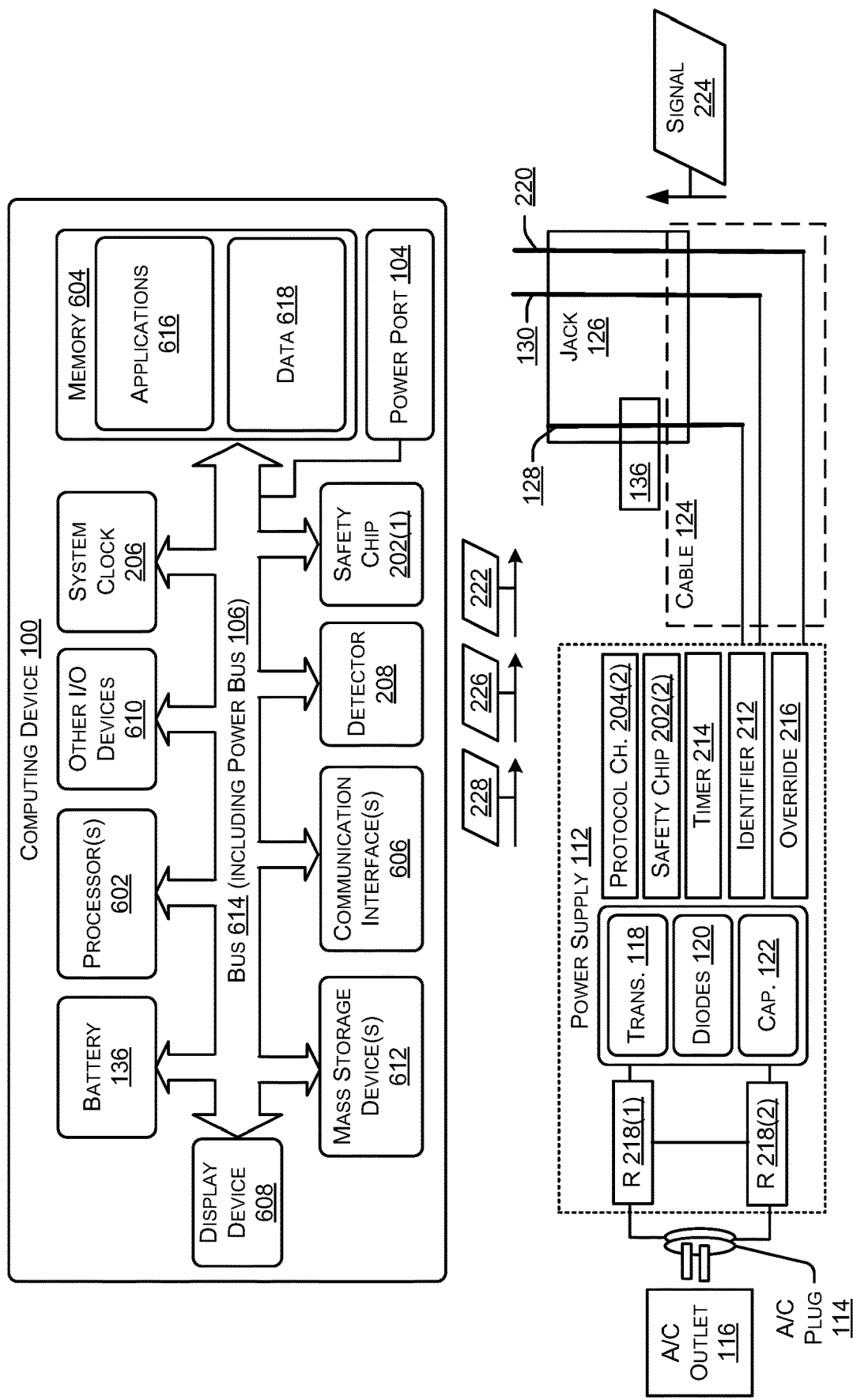
FIG. 6 illustrates an example configuration of a computing device that can be used to implement the systems and techniques described herein.

FIG. 6 illustrates an example configuration of a computing device 600 that can be used to implement the computing device 102. The computing device 600 may include one or more processors 602 (e.g., CPU, GPU, or the like), a memory 604, communication interfaces 606, a display device 608, other input/output (I/O) devices 610 (e.g., keyboard, trackball, and the like), and one or more mass storage devices 612 (e.g., disk drive, solid state disk drive, or the like), configured to communicate with each other, such as via one or more system buses 614 or other suitable connections. While a single system bus 614 is illustrated for ease of understanding, it should be understood that the system buses 614 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), the power bus 106 of FIG. 1, etc.

The processors 602 are one or more hardware devices that may include a single processing unit or a number of processing units, all of which may include single or multiple computing units or multiple cores. The processors 602 may include a graphics processing unit (GPU) that is integrated into the CPU or the GPU may be a separate processor device from the CPU. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processors 602 to perform the various functions described herein. For example, memory 604 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein and may be any type of non-transitory media capable of storing computer-readable, processor-executable program instructions as computer program code that can be executed by the processors 602 as a particular machine configured for carrying out the operations and functions described in the implementations herein.

The computing device 600 may include one or more communication interfaces 606 for exchanging data with other computing devices via a network. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

The display device 608 may be used for displaying content (e.g., information and images) to users. Other I/O devices 610 may be devices that receive various inputs from a user and provide various outputs to the user, and may include a keyboard, a touchpad, a mouse, a printer, audio input/output devices, and so forth. The computer storage media, such as memory 116 and mass storage devices 612, may be used to store software and data, such as, for example, one or more applications 616 and data 618.

Thus, when the power supply 112 is connected to the A/C outlet 116 and the power jack 126 is unconnected to the power port 104, the power supply 112 does not provide DC power via the power jack 126. After the power jack 126 is connected to the computing device 100, the safety chip 202(1) may provide the signal 222, that includes power, to the safety chip 202(2) in the power supply 112. The chips 202(1), 202(2) may communicate to set a time when the power supply 112 provides DC power to the computing device 100. For example, the safety chip 202(1) may send the instruction 226 to the safety chip 202(2) to begin power delivery 300 milliseconds (ms) after the safety chip 202(2) receives the instruction 226. In response, the safety chip 202(2) may set the timer 214 to countdown a predetermined amount of time, such as, for example, 300 ms. When the chip 202(2) determines that the timer 214 is zero, the chip 202(2) may cause the relays 218 to latch, causing A/C to flow through the power supply 112 and be output as DC via the jack 126, to the power port 104. The chips 202(1), 202(2) may repeatedly communicate with each other while the power jack 126 is connected to the power port 104. For example, the safety chip 202(1) may periodically (e.g., at a predetermined time interval) send the continue instruction 228 to the safety chip 202(2) to continue to keep the relays 218 closed, thereby continuing the delivery of DC power via the jack 126 to the computing device 100. If the power jack 126 is disconnected from the power port 104 of the computing device 100, the safety chip 202(2) stops receiving communications (e.g., the continue instruction 228) from the safety chip 202(1), causing the safety chip 202(2) to stop keeping the relays 218 closed, causing the relays 218 to open, causing the power supply to stop making DC power available via the power jack 126. The override 216 selector may enable a user to temporarily override the safety chip 202(2) and cause the relays 218 to close for a particular period of time. In this way, the override 216 enables the power supply to provide power to the computing device 100 when the battery 136 is depleted, unable to hold a charge, or not present.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    determining, by a first safety chip of a computing device, that a power jack of a power supply has been connected to a power port of the computing device;
    sending, by the first safety chip, signaling power to a second safety chip of the power supply;
    receiving, by the first safety chip, a message from the second safety chip indicating that the second safety chip is receiving the signaling power;
    sending, by the first safety chip, an instruction to the second safety chip to cause the power supply to provide direct current via the power jack; and
    determining, by the first safety chip, that the power supply is providing the direct current via the power jack to the computing device.

2. The method of claim 1, wherein:
    the power jack is connected to the power supply using a cable comprising:
        a positive wire;
        a negative wire; and
        a communication wire; and
    the first safety chip sends the signaling power to the second safety chip over the communication wire.

3. The method of claim 1, wherein:
    the message from the second safety chip comprises a command that is compliant with a 1-wire protocol.

4. The method of claim 1, wherein:
    the instruction to the second safety chip specifies a time at which to cause the power supply to provide direct current via the power jack.

5. The method of claim 1, further comprising:
    determining a battery level of a battery of the computing device;
    determining that the battery level is greater than or equal to a predetermined battery threshold; and
    stopping sending the instruction to the second safety chip to cause the power supply to provide direct current via the power jack.

6. The method of claim 5, further comprising:
    determining a second battery level of the battery of the computing device;
    determining that the second battery level is less than a second predetermined battery threshold; and
    resuming sending the instruction to the second safety chip to cause the power supply to provide direct current via the power jack.

7. The method of claim 1, wherein the power port comprises one of a:
    a proprietary port; or
    a universal serial bus (USB) type C port.

8. A computing device comprising:
    a battery to power the computing device;
    one or more processors;
    one or more non-transitory computer-readable storage media; and
    a first safety chip configured with instructions to:
        determine that a power jack of the power supply has been connected to a power port of the computing device;
        send signaling power to a second safety chip of the power supply;
        receive a message from the second safety chip indicating that the second safety chip is receiving the signaling power;
        send an instruction to the second safety chip to cause the power supply to provide direct current via the power jack;
        determine that the power supply is providing the direct current via the power jack to the computing device; and
        stop sending signaling power to a second safety chip of the power supply.

9. The computing device of claim 8, wherein:
    the power jack is connected to the power supply using a cable comprising:
        a positive wire;
        a negative wire; and
        a communication wire; and
    the first safety chip sends the signaling power and the instruction to the second safety chip over the communication wire.

10. The computing device of claim 8, wherein:
    the message from the second safety chip comprises a command that is compliant with a 1-wire protocol.

11. The computing device of claim 8, wherein:
    the power port comprises a universal serial bus (USB) type-C port implementing USB compliant power delivery;
    the power jack is connected to the power supply using a USB type-C compliant cable; and
    the first safety chip sends the signaling power and the instruction to the second safety chip over a configuration channel (CC) of the USB type-C port.

12. The computing device of claim 8, wherein the first safety chip is further configured to:
    determine a battery level of a battery of the computing device;
    determine that the battery level is greater than or equal to a predetermined battery threshold; and
    stop sending the instruction to the second safety chip to cause the power supply to provide direct current via the power jack.

13. The computing device of claim 12, wherein the first safety chip is further configured to:
    determine a second battery level of the battery of the computing device;
    determine that the second battery level is less than a second predetermined battery threshold; and
    resume sending the instruction to the second safety chip to cause the power supply to provide direct current via the power jack.

14. The computing device of claim 8, wherein the first safety chip is further configured to:
    determine a battery level of a battery of the computing device;
    determine that the battery level is greater than or equal to a predetermined battery threshold; and
    stop sending the instruction to the second safety chip to cause the power supply to provide direct current via the power jack.

15. A power supply comprising:
    a transformer;
    a first relay located between a transformer and a first wire of a plug that is connected to a wall socket providing alternating current;

a second relay located between the transformer and a second wire of the plug, wherein the first relay and the second relay have a normally open state; and a second safety chip configured to:
receive signaling power from a first safety chip in a computing device after a power jack of the power supply is connected to a power port of the computing device;
send, to the first safety chip, a message indicating that the second safety chip is receiving the signaling power;
receive, from the first safety chip, an instruction to initiate power deliver to the computing device from the power supply; and
causing the first relay and the second relay to transition from the normally open state to a closed state, resulting in direct current being provided by the power jack to the computing device.

16. The power supply of claim 15, wherein the second safety chip is further configured to:
stop receiving, from the first safety chip, the instruction; and
causing the first relay and the second relay to transition from the closed state to the normally open state, causing power to stop being provided by the power jack to the computing device.

17. The power supply of claim 15, wherein:
the message from the second safety chip comprises a command that is compliant with a 1-wire protocol.

18. The power supply of claim 15, further comprising:
a cable connecting the power jack to the power supply, the cable comprising:
a positive wire;
a negative wire; and
a communication wire, wherein the first safety chip sends the signaling power to the second safety chip over the communication wire.

19. The power supply of claim 15, wherein:
the power port comprises a universal serial bus (USB) type-C port implementing USB compliant power delivery;
the power jack is connected to the power supply using a USB type-C compliant cable; and
the first safety chip sends the signaling power and the instruction to the second safety chip over a configuration channel (CC) of the USB type-C port.

20. The power supply of claim 19, wherein:
the first safety chip sends the signaling power and the instruction to the second safety chip over the CC of the USB type-C port using alternate mode.

* * * * *